US012651838B2

(12) United States Patent
Zhao et al.

(10) Patent No.: US 12,651,838 B2
(45) Date of Patent: Jun. 9, 2026

(54) EXTENDABLE USER COMMUNICATION DEVICE WITH LOW PROFILE PATCH ANTENNA FOR SATELLITE COMMUNICATIONS

(71) Applicant: MOTOROLA MOBILITY LLC, Wilmington, DE (US)

(72) Inventors: Junsheng Zhao, Vernon Hills, IL (US); Xuyuan Pan, Chicago, IL (US); Md Faisal Abedin, Lake Bluff, IL (US); Mohammed Abdul-Gaffoor, Palatine, IL (US)

(73) Assignee: Motorola Mobility LLC, Chicago, IL (US)

( * ) Notice: Subject to any disclaimer, the term of this patent is extended or adjusted under 35 U.S.C. 154(b) by 230 days.

(21) Appl. No.: 18/479,013

(22) Filed: Sep. 30, 2023

(65) Prior Publication Data

US 2025/0112367 A1 Apr. 3, 2025

(51) Int. Cl.

| | |
|---|---|
| ***H01Q 9/04*** | (2006.01) |
| ***H01Q 7/02*** | (2006.01) |
| *H01Q 1/42* | (2006.01) |

(52) U.S. Cl.

CPC ............. *H01Q 9/0407* (2013.01); *H01Q 7/02* (2013.01); *H01Q 1/427* (2013.01)

(58) Field of Classification Search

CPC .......... H01Q 1/427; H01Q 1/243; H01Q 5/40; H01Q 7/02; H01Q 9/0407; H01Q 21/28

See application file for complete search history.

(56) References Cited

FOREIGN PATENT DOCUMENTS

| | | | |
|---|---|---|---|
| WO | WO-2022050762 A1 * | 3/2022 | ............. H01Q 9/285 |
| WO | WO-2023182799 A1 * | 9/2023 | .......... H04M 1/0268 |

* cited by examiner

*Primary Examiner* — Hoang V Nguyen

(74) *Attorney, Agent, or Firm* — Isidore PLLC

(57) ABSTRACT

A communication device, method and computer program product enable satellite communication via a patch antenna incorporated into an extendable display device. A flexible display support structure moveably attached to and positionable on a base housing between retracted and extended positions. One of the flexible display support structure and the base housing has an antenna surface that is covered by the other one while the flexible display support structure is retracted and uncovered while extended. A flexible display is coupled across a front side of the base housing and the flexible display support structure to present a larger portion while extended and a smaller portion while retracted. A patch antenna is positioned on the antenna surface. The patch antenna includes a ground plane, a substrate comprising a low dielectric constant and low loss material and positioned on the ground plane, and a conductive radiator patch positioned on the substrate.

19 Claims, 13 Drawing Sheets

EXTENDABLE USER COMMUNICATION DEVICE WITH LOW PROFILE PATCH ANTENNA FOR SATELLITE COMMUNICATIONS

BACKGROUND

1. Technical Field

The present disclosure relates generally to extendable portable communication devices, and more particularly to extendable portable communication devices that supports satellite communication.

2. Description of the Related Art

Portable electronic communication devices, particularly smartphones, have become ubiquitous. People all over the world use such devices to stay connected. These devices have been designed in various mechanical configurations. Conventionally, these communication devices each have a rigid display disposed along a major face of the communication device. One recent configuration of handheld portable electronic devices incorporates rollable or scrollable flexible displays, where the displays extend or retract via a telescoping housing or via a sliding blade that either rolls the flexible display onto a back of the device housing or extends the flexible display from a front side of the device housing.

Antennas are incorporated into the extendable communication devices to support communications in one or more radio frequency (RF) bands using one or more communication protocols. Locations on the extendable communication devices for antennas are limited by the overall small size of the portable communication devices and by one or more displays that can cover a front side and portions of a back side. Some RF bands may be supportable by antennas positioned along thin lateral edges of the communication devices. However, some antennas need to be on the front side or the back side due to their size. In an example, patch antennas for satellite communication have a large footprint. Conventional antennas for satellite communication utilize a thick ceramic substrate that is not feasible or desirable for incorporating into an extendable communication device.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
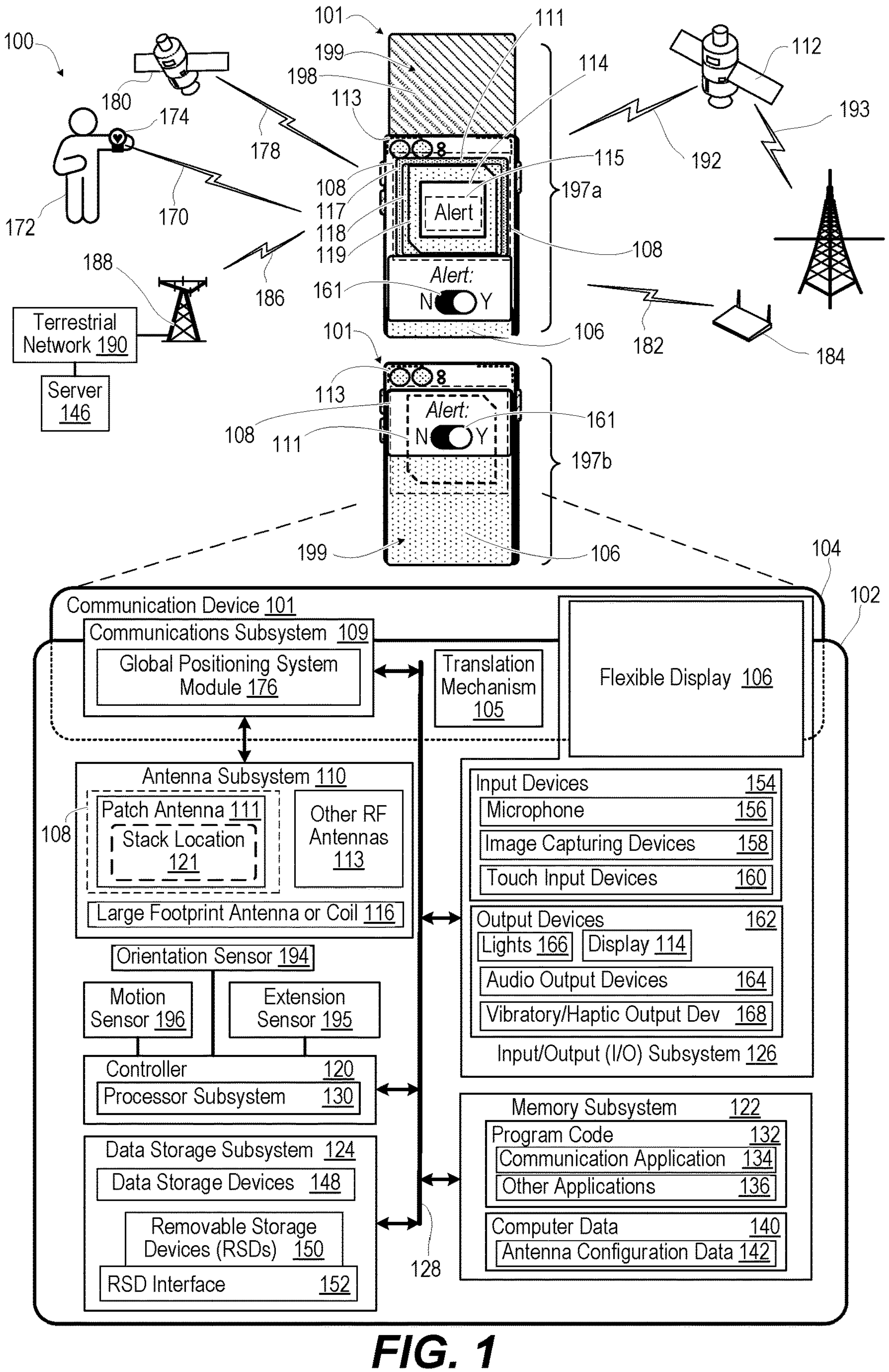
FIG. 1 presents a simplified functional block diagram and back views of a first example communication device that includes an extendable blade assembly affixed to a base housing to which is attached a low-profile satellite patch antenna with an attached display, the display and patch antenna being uncovered while the blade assembly is in an extended position, according to one or more embodiments.

According to aspects of the present disclosure, a communication device, a method, and a computer program product provide satellite communication via a patch antenna incorporated into the communication device that has an extendable display form factor. The communication device includes a base housing having a front side and a back side. The communication device includes a flexible display support structure moveably attached to and positionable on the base housing between a retracted position and an extended position relative to the base housing. One of the flexible display support structure and the base housing has an antenna surface. A patch antenna of the communication device is positioned on the antenna surface. The patch antenna includes: (i) a ground plane; (ii) a substrate of a low dielectric constant and low loss material and positioned on the ground plane; and (iii) a conductive radiator patch positioned on the substrate. The patch antenna is covered by the other one of the flexible display support structure and the base housing while the flexible display support structure is in the retracted position. The antenna surface is uncovered while the flexible display support structure is in the extended position. A flexible display of the communication device is coupled across a front side of the base housing and the flexible display support structure. The flexible display presents a larger portion of the flexible display while the flexible display support structure is in the extended position. The flexible display presents a smaller portion of the flexible display while the flexible display support structure is in the retracted position.

The present disclosure addresses particular challenges for satellite communications by a portable hand-held device. Unlike with global positioning system (GPS) communication, which requires only a GPS receiver to receive GPS satellite signals, satellite communications include transmitting as well as receiving signals. Because the satellite signal is right hand circular polarized (RHCP), a typical linear polarized antenna for wireless communications is not preferred for satellite communications. The present disclosure provides for an RHCP patch antenna in addition to the linear polarized antenna for wireless communications within the same form factor of the communication device. A RHCP patch antenna inherently has a 3 dB higher antenna gain as compared to a linear antenna for transceiving an RHCP signal (i.e., the linear antenna loses half of the antenna performance of the RHCP patch antenna). The RHCP patch antenna has a wide main beam which reduces the reliance of aligning the antenna pattern with the position/location of the satellites, which may result in an enhanced user experience by acquiring a radio link quicker. In addition, among RHCP antennas, a patch antenna solution is more desired due to several inherent advantages including higher performance, low profile, low cost, and simplified fabrication, etc. Particular embodiments of the RHCP patch antenna according to the present disclosure have a particularly low profile of 0.5-1.0 mm thickness by using a low dielectric constant plastic substrate with low loss. By contrast, conventional satellite antennas have a 4 mm thick ceramic substrate along with a relatively large ground plane, which may be unsuitable or at least undesirable for use in a portable device.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 presents a simplified functional block diagram of a communication device 101 having an extendable design form that may operate as a mobile user device in communication environment 100, in which the features of the present disclosure are advantageously implemented. Communication device 101 can be one of a host of different types of devices, including but not limited to, a mobile cellular phone, satellite phone, or smart phone, a laptop, a netbook, an ultra-book, a networked smartwatch or networked sports/exercise watch, and/or a tablet computing device or similar device that can include wireless communication functionality. As a device supporting wireless communication, communication device 101 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices.

Communication device 101 includes base housing 102 having a front side and a back side. Flexible display support structure 104 is moveably attached to and positionable on base housing 102 between a retracted position and an extended position relative to base housing 102. In one or more embodiments, translation mechanism 105 moves flexible display support structure 104 relative to base housing 102. Flexible display 106 is coupled across at least a front face of base housing 102 and flexible display support structure 104. Communication device 101 presents a larger portion of flexible display 106 while flexible display support structure 104 is in the extended position and a smaller portion of flexible display 106 while flexible display support structure 104 is in the retracted position.

Communication device 101 includes communications subsystem 109 that performs radio frequency (RF) communication via antenna subsystem 110 incorporated into base housing 102 and flexible display support structure 104. Locations available for incorporating antenna subsystem 110 are limited especially when flexible display support structure 104 is retracted. Displays such as flexible display 106 require planar areas on at least the front face of base housing 102 and flexible display support structure 104, further limiting the locations available for antenna subsystem 110. In one or more embodiments, a back side of base housing 102 has antenna surface 108 that provides a planar surface for an antenna having a large footprint. As described below regarding FIGS. 7A-7C and 8A-8D, in one or more embodiments, a back side of flexible display support structure 104 has antenna surface 108 that provides a planar surface for an antenna having a large footprint. In the retracted position, blade assembly 199 covers antenna surface 108. In the extended position, blade assembly 199 uncovers antenna surface 108.

Communications subsystem 109 is communicatively connectable, via patch antenna 111 of antenna subsystem 110, to satellites 112 for communication services. Patch antenna 111 has a large footprint requiring a planar surface on either the front side or the back side of communication device 101, such as antenna surface 108. In addition to patch antenna 111, antenna subsystem 110 may include RF antennas 113 that have a small footprint that do not require positioning on large planar surface of base housing 102 and flexible display support structure 104. In one or more embodiments, RF antennas 113 are positioned around communication device 101 for spatial diversity and operability in both retracted and extended positions. RF antennas 113 may be incorporated at, or proximate to, thin edges along right, left, top, and bottom edges of base housing 102 and flexible display support structure 104.

In one or more embodiments, patch antenna 111 has stack location 121 on which may be stacked with other functional components to more efficiently utilize locations on base housing 102 and flexible display support structure 104. To avoid degrading antenna efficiency of patch antenna 111, the functional component needs to be smaller than the patch antenna 111 to not interfere with a fringe electromagnetic field as described below for FIGS. 4-5. In an example, display 114 may be positioned at stack location 121 on top of patch antenna 111, enabling presentation of display content 115 related to satellite communications while flexible display support structure 104 is in the extended position. In addition to satellite communication capabilities, communication device 101 may include other wireless and cellular RF communication or energy transfer capabilities supported by one or more second antenna or coil 116 that also have a large footprint. As an alternative to or in addition to display 114, second antenna or coil 116 may be stacked with patch antenna 111. Examples of second antenna or coil 116 that are planar with a large footprint include a near field communication (NFC) antenna, an ultra-wideband (UWB) antenna, and a wireless charger (WLC) coil. A WLC coil inductively couples to an electromagnetic field generated by a wireless charger over a short distance rather than producing or receiving an RF broadcast signal.

Figure 2:
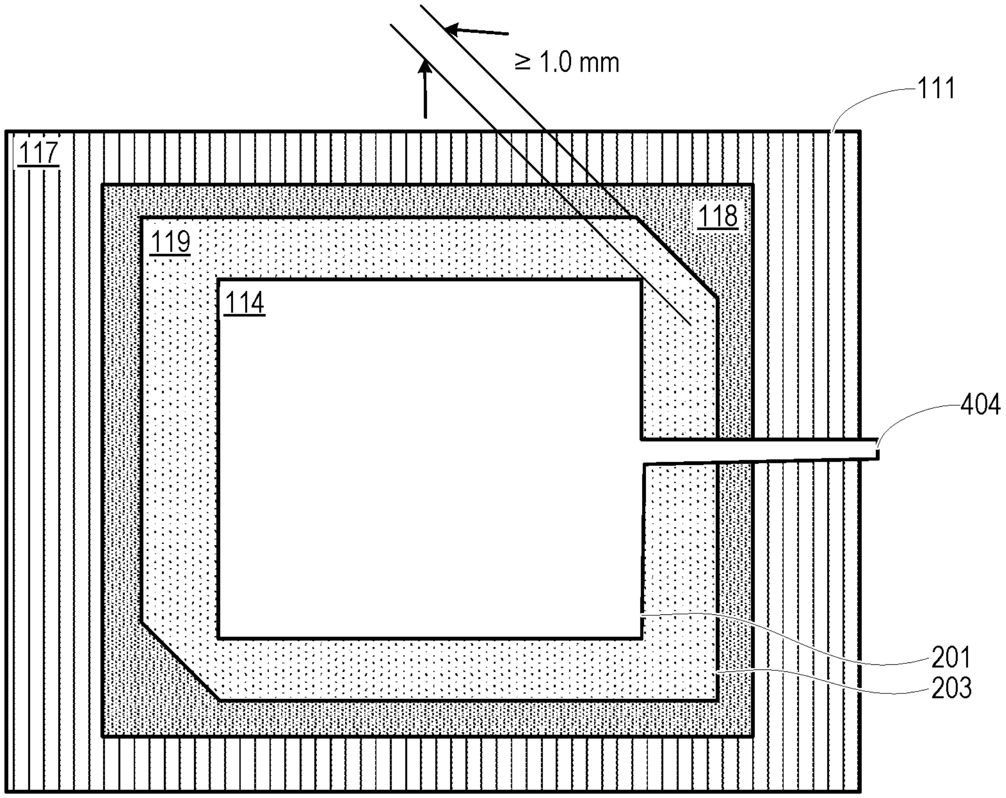
FIG. 2 is a front view of the display positioned on the patch antenna of FIG. 1, according to one or more embodiments.
Figure 3:
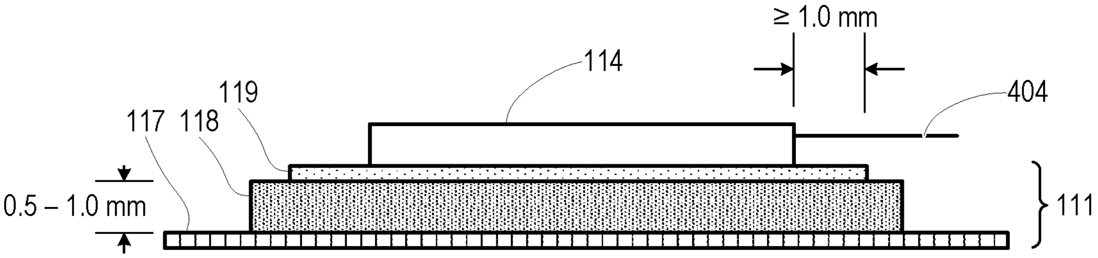
FIG. 3 is a side view of the display positioned on the patch antenna of FIG. 1, according to one or more embodiments.

FIG. 2 is a front view of display 114 positioned on an exposed surface of patch antenna 111 as an example of stacking a functional component with patch antenna 111 without significantly degrading antenna efficiency of patch antenna 111. An opposite surface of patch antenna 111 is inwardly directed toward communication device 101 (FIG. 1) and is affixed, attached, or incorporated in an outer surface or outer covering material of communication device 101 (FIG. 1). FIG. 3 is a side view of display 114 positioned on patch antenna 111. With reference to FIGS. 1, 2, and 3, in one or more embodiments, patch antenna 111 is a right hand circularly polarized (RHCP) antenna that includes: (i) ground plane 117 that is attachable to communication device 101 (FIG. 1); (ii) substrate 118 of a low dielectric constant and low loss material (e.g., a plastic material in a range of 0.5 to 1 mm thickness) and positioned on ground plane 117; and (iii) conductive radiator patch 119 positioned on substrate 118. In one or more embodiments, patch antenna 111 is configured to transmit and to receive an RHCP RF signal in a frequency range of 1-2 GHz. Conductive radiator patch 119 of patch antenna 111 has a first footprint size. Display 114 has a second footprint size that is smaller than the first footprint size of patch antenna 111. Display 114 is positioned on conductive radiator patch 119 of patch antenna 111 with second outer edge 201 (FIG. 2) of display 114 located within outer edge 203 (FIG. 2) of patch antenna 111. Second outer edge 201 (FIG. 2) of display 114 is spaced inwardly at least 1 mm from corresponding outer edge 203 (FIG. 2) of patch antenna 111, with the exception of flex tail 404 of display 114. In one or more embodiments, second antenna or coil 116 (FIG. 1) may be similarly sized and positioned as an alternative to display 114 or be positioned between display 114 and patch antenna 111.

Figure 4:
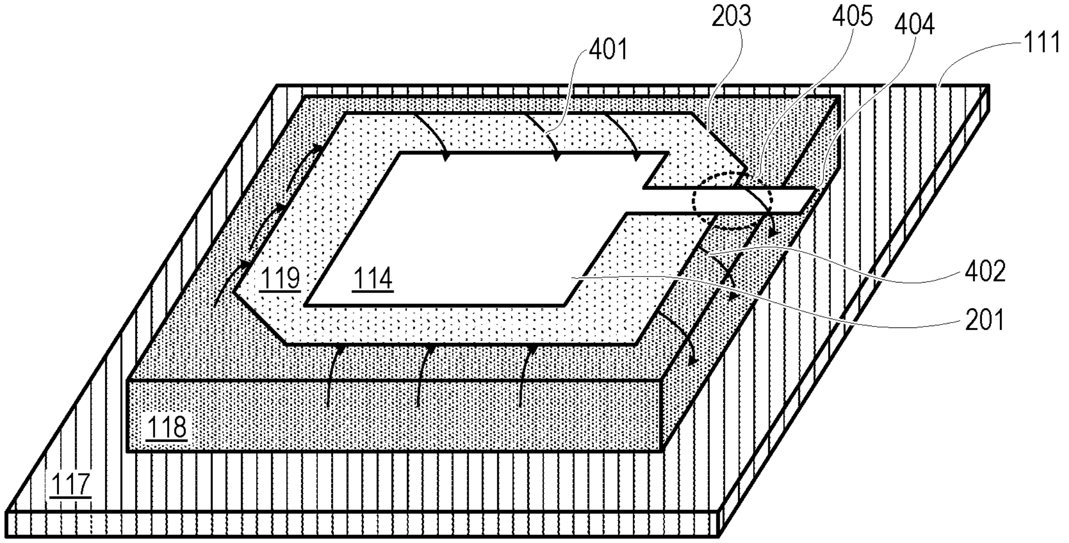
FIG. 4 is a three-dimensional view of the display positioned on the patch antenna of FIG. 1 annotated with electromagnetic flux lines of a fringe field, according to one or more embodiments.
Figure 5:
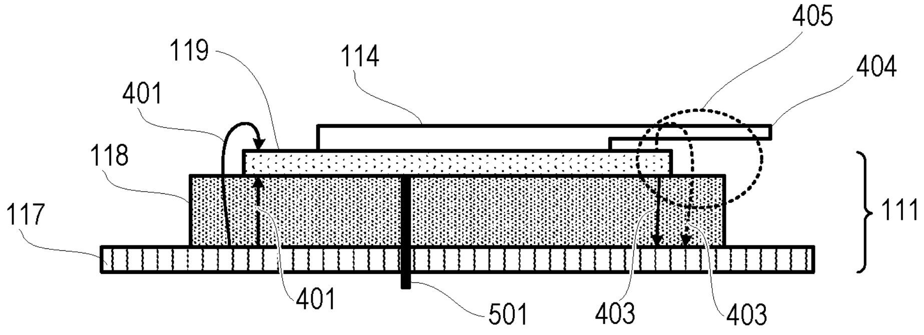
FIG. 5 is a side view of the display positioned on the patch antenna of FIG. 4 annotated with electromagnetic flux lines including a probe line that transfers signals to the patch antenna, according to one or more embodiments.

FIG. 4 is a three-dimensional view of display 114 positioned on patch antenna 111 and annotated with electromagnetic flux lines 401 from ground plane 117 to conductive radiator patch 119 and flux lines 402 from conductive radiator patch 119 to ground plane 117. Flux lines 401-402 are fringe fields at outer edge 203 of conductive radiator patch 119. Second outer edge 201 of display 114 may include conductors or other electromagnetically interfering component that are set back from outer edge 203, enabling coexistence within patch antenna 111 without significant interference with the fringe field. Only flex tail 404 with signal lines of display 114 passes through flux lines 401-402 of patch antenna 111. Relatively small area 405 of potential interference does not significantly degrade antenna performance of patch antenna 111. FIG. 5 is a side cutaway view of display 114 positioned on patch antenna 111 and annotated with electromagnetic flux lines 401-402 and including probe line 501 that is a vertical feed that transfers signals to conductive radiator patch 119. In one or more embodiments, instead of probe line 501, patch antenna 111 may receive signals through a side feed transmission line on the same plane of conductive radiator patch 119 as depicted for display 114 and flex tail 404.

With continued reference to FIG. 1, in addition to communications subsystem 109, communication device 101 may include controller 120, memory subsystem 122, data storage subsystem 124 and input/output (I/O) subsystem 126. To enable management by controller 120, system interlink 128 communicatively connects controller 120 with communications subsystem 109, memory subsystem 122, data storage subsystem 124 and input/output (I/O) subsystem 126. System interlink 128 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (i.e., system interlink 128) are illustrated in FIG. 1, it is to be understood that more, fewer, or different interconnections may be present in other embodiments.

Controller 120 includes processor subsystem 130, which includes one or more central processing units (CPUs) or data processors. Processor subsystem 130 can include one or more digital signal processors that can be integrated with data processor(s). Processor subsystem 130 can include other processors such as auxiliary processor(s) that may act as a low power consumption, always-on sensor hub for physical sensors. Controller 120 manages, and in some instances directly controls, the various functions and/or operations of communication device 101. These functions and/or operations include, but are not limited to including, application data processing, communication with second communication devices, navigation tasks, image processing, and signal processing. In one or more alternate embodiments, communication device 101 may use hardware component equivalents for application data processing and signal processing. For example, communication device 101 may use special purpose hardware, dedicated processors, general purpose computers, microprocessor-based computers, micro-controllers, optical computers, analog computers, dedicated processors and/or dedicated hard-wired logic.

Memory subsystem 122 stores program code 132 for execution by processor subsystem 130 to provide the functionality described herein. Program code 132 includes applications such as communication application 134 that is configurable for communicating with satellite 112. Program code 132 may include other applications 136. These applications may be software or firmware that, when executed by controller 120, configures communication device 101 to provide functionality described herein. In one or more embodiments, several of the described aspects of the present disclosure are provided via executable program code of applications executed by controller 120. In one or more embodiments, program code 132 may be integrated into a distinct chipset or hardware module as firmware that operates separately from executable program code. Portions of program code 132 may be incorporated into different hardware components that operate in a distributed or collaborative manner. Implementation of program code 132 may use any known mechanism or process for doing so using integrated hardware and/or software, as known by those skilled in the art. Memory subsystem 122 further includes operating system (OS), firmware interface, such as basic input/output system (BIOS) or Uniform Extensible Firmware Interface (UEFI), and firmware, which also includes and may thus be considered as program code 132.

Program code 132 may access, use, generate, modify, store, or communicate computer data 140, such as antenna configuration data 142. Computer data 140 may incorporate "data" that originated as raw, real-world "analog" information that consists of basic facts and figures. Computer data 140 includes different forms of data, such as numerical data, images, coding, notes, and financial data. Computer data 140 may originate at communication device 101 or be retrieved by communication device 101 from a second device, such as network server 146, to which communication device 101 can communicatively connect. Communication device 101 may store, modify, present, or transmit computer data 140. Computer data 140 may be organized in one of a number of different data structures. Common examples of computer data 140 include video, graphics, text, and images. Computer data 140 can also be in other forms of flat files, databases, and other data structures.

Data storage subsystem 122 of communication device 101 includes data storage device(s) 148. Controller 120 is communicatively connected, via system interlink 128, to data storage device(s) 148. Data storage subsystem 124 provides program code 132 and computer data 140 stored on nonvolatile storage that is accessible by controller 120. For example, data storage subsystem 124 can provide a selection of program code 132 and computer data 140. These applications can be loaded into memory subsystem 122 for execution/processing by controller 120. In one or more embodiments, data storage device(s) 148 can include hard disk drives (HDDs), optical disk drives, and/or solid-state drives (SSDs), etc. Data storage subsystem 124 of communication device 101 can include removable storage device(s) (RSD(s)) 150, which is received in RSD interface 152. Controller 120 is communicatively connected to RSD 150, via system interlink 128 and RSD interface 152. In one or more embodiments, RSD 150 is a non-transitory computer program product or computer readable storage device that may be executed by a processor associated with a user device such as communication device 101. Controller 120 can access data storage device(s) 148 or RSD 150 to provision communication device 101 with program code 132 and computer data 140.

I/O subsystem 126 may include input devices 154 such as microphone 156, image capturing devices 158, and touch input devices 160 (e.g., screens, keys or buttons). In one or more embodiments, input devices 154 includes a dedicated emergency alert control 161 that receives manual activation to trigger sending an emergency alert to satellite 112. Input devices 154 may receive a user input that indicates a trigger to initiate satellite communications. I/O subsystem 126 may include output devices 162 such as flexible display 106, audio output devices 164, lights 166, and vibratory or haptic output devices 168. One or more of the output devices may present a status indication of an alert transmitted by communication device 101 to satellite 112. In an example, display content 115 is an alert status indication presented by display 114.

In one or more embodiments, controller 120, via communications subsystem 109, performs multiple types of cellular over-the-air (OTA) or wireless communication, such as by using a Bluetooth connection or other personal access network (PAN) connection 170. In an example, user 172 may wear a health monitoring device depicted as smartwatch 174 that is communicatively coupled via connection 170. Smartwatch 174 may send a message to communication device that is a trigger for communicating with satellite 112. In an example, smartwatch 174 may detect a health abnormality of user 172, warranting immediate attention by healthcare first responder. In one or more embodiments, communications subsystem 109 includes global positioning system (GPS) module 176 that receives GPS broadcasts 178 from GPS satellites 180 to obtain geospatial location information. In one or more embodiments, controller 120, via communications subsystem 109, communicates via a wireless local area network (WLAN) link 182 using one or more IEEE 802.11 WLAN protocols with access point 184. In one or more embodiments, controller 120, via communications subsystem 109, may communicate via an OTA cellular connection 186 with radio access networks (RANs) 188. In an example, communication device 101, via communications subsystem 109, connects via RANs 188 of terrestrial network 190 that is communicatively connected to network server 146. According to aspects of the present disclosure, controller 120, via communications subsystem 109 and patch antenna 111, communicates via satellite uplink and downlink 192 with satellite 112 that is part of a non-terrestrial network 193.

Controller 120 may be directly communicatively coupled, or indirectly communicatively coupled via system interlink 128 or a support processor, to one or more physical sensors. In an example, physical sensors may include orientation sensor 194 configured to detect in which direction is up. Physical sensors may include extension sensor 195 configured to detect a position of flexible display support structure 104 between retracted and extended positions. Physical sensors may include motion sensor 196 configured to detect accelerations of communication device 101. Physical sensors (194 and 196) may provide information used to detect a trigger to begin satellite communications. In an example, an abrupt deceleration may indicate a fall or a vehicular accident. In another example, a prolonged stationary period may indicate that communication device 101 was inadvertently dropped and not recovered. Physical sensors (194, 195 and 196) may provide information about whether communication device 101 is correctly oriented to present patch antenna 111 upward toward satellite 112. In an example, orientation sensor 194 is configured to sense whether patch antenna 111 is positioned upwardly. In another example, extension sensor 195 detects whether or not patch antenna 111 is uncovered. Alternatively, or in addition, communications subsystem 109 may provide information about whether patch antenna 111 is receiving a downlink or broadcast from satellite 112.

In addition to the block diagram for communication device 101, at a top center location and to the left of bracket 197*a*, there is depicted a first back view of communication device 101 while in an extended position as a first example of an extendable design form. Flexible display support structure 104 is implemented as blade substrate 198 of blade assembly 199 that includes flexible display 106. Blade assembly 199 is slidably coupled to base housing 102 to roll a portion of flexible display 106 between a front side and a back side of base housing 102. Below and to the left of bracket 197*b*, a second back view of communication device 101 is depicted with blade assembly 199 in a retracted position.

Figure 6:
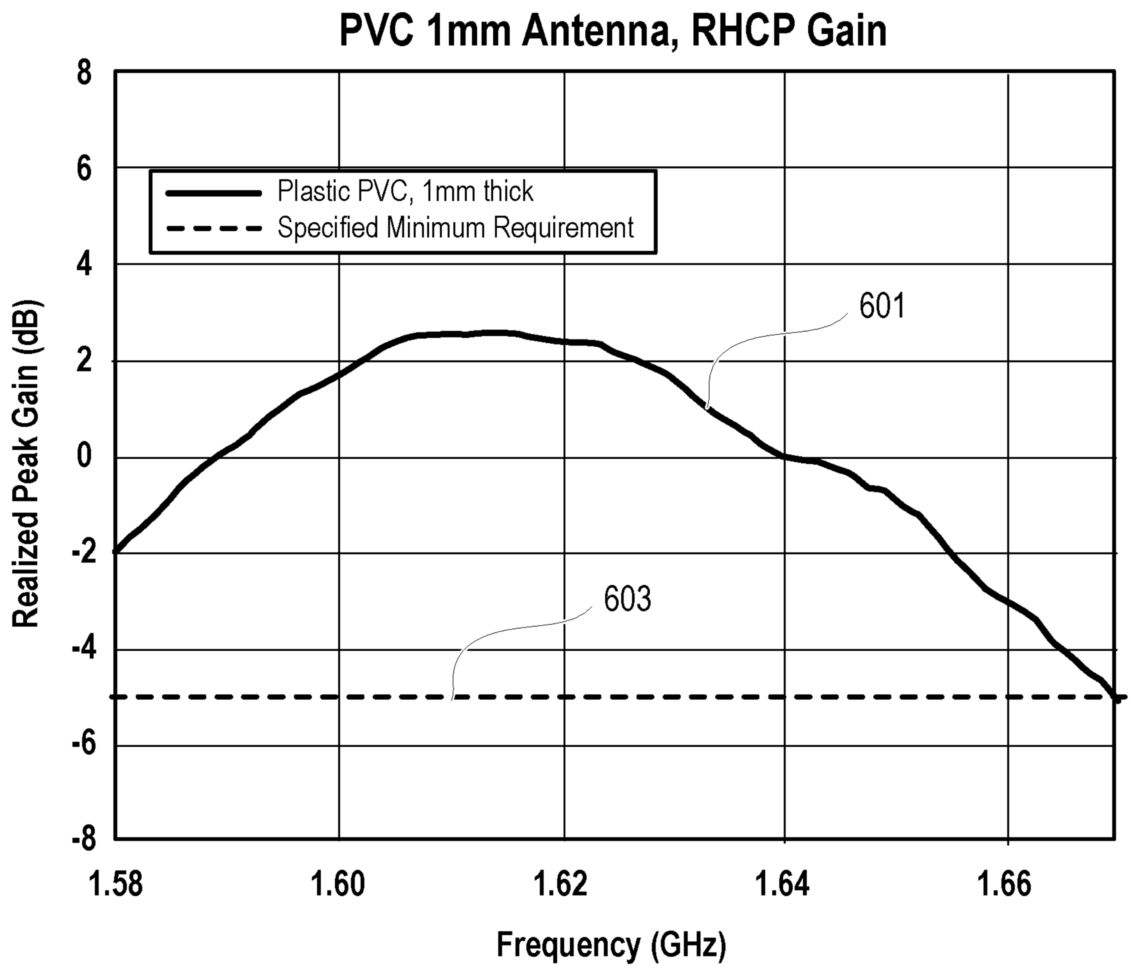
FIG. 6 is a graphical plot of realized peak gain in decibels (dB) as a function of frequency of the patch antenna of FIG. 1, according to one or more embodiments.

FIG. 6 is a graphical plot 601 of realized peak gain in decibels (dB) as a function of frequency of the patch antenna of FIG. 1. Horizontal plot 603 is an industry standard for realized peak gain. Satisfactory realized peak gain is above horizontal plot 603. In electromagnetics, an antenna's gain is a key performance parameter which combines the antenna's directivity and radiation efficiency. In a transmitting antenna, the gain describes how well the antenna converts input power into radio waves headed in a specified direction. In a receiving antenna, the gain describes how well the antenna converts radio waves arriving from a specified direction into electrical power. When no direction is specified, gain is understood to refer to the peak value of the gain, the gain in the direction of the antenna's main lobe. Gain or 'absolute gain' is defined as the ratio of the radiation intensity in a given direction to the radiation intensity that would be produced if the power accepted by the antenna were isotropically radiated. Due to reciprocity, the gain of any antenna when receiving is equal to its gain when transmitting. Realized gain differs from gain in that it is reduced by its impedance mismatch factor. This mismatch induces losses above the dissipative losses; therefore, realized gain will always be less than gain. A higher realized gain is better (i.e., more efficient) than a lower realized gain. Performance of the patch antenna 111 of FIG. 1 is better than the industry standard.

The present disclosure provides multiple examples of incorporating patch antenna 111 as different locations within an extendable display device having flexible display 106 extended across base housing 102 and flexible display support structure 104. In the first embodiment, antenna surface 108 of communication device 101 (FIG. 1) is on base housing 102. Flexible display support structure 104 is implemented as blade assembly 199. Patch antenna 111 on base housing 102 is covered by blade assembly 199 in the retracted position and uncovered by blade assembly 199 in the extended position.

Figures 7A, 7B, 7C:
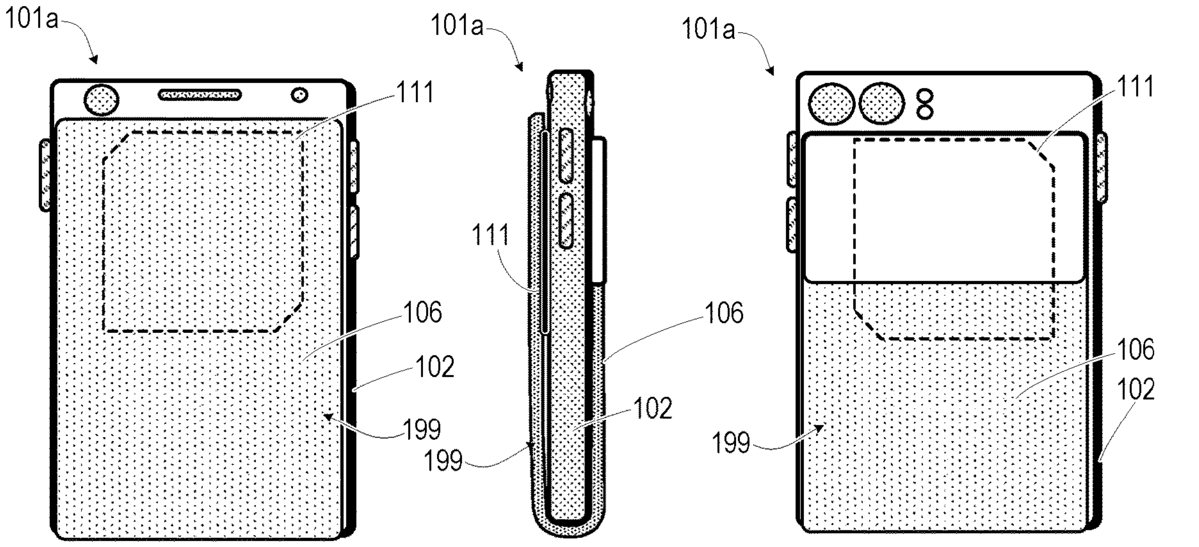
FIG. 7A is a front view of a second example communication device having a blade assembly in a retracted position covering the patch antenna that is attached to the blade assembly, according to one or more embodiments.
FIG. 7B is a left side view of the second example communication device of FIG. 7A, according to one or more embodiments.
FIG. 7C is a back view of the second example communication device of FIG. 7A, according to one or more embodiments.

In a second embodiment, antenna surface 108 of communication device 101*a* (FIG. 7A-7C, 8A-8D) is on a backside of blade assembly 199. Patch antenna 111 is covered by bases housing 102 in the retracted position and uncovered by base housing 102 in the extended position. FIG. 7A is a front view of second example communication device 101*a* having blade assembly 199 in a retracted position covering patch antenna 111. FIG. 7B is a left side view of second example communication device 101*a* of FIG. 7A. FIG. 7C is a back view of second example communication device 101*a* of FIG. 7A. With particular reference to FIGS. 7B-7C, blade assembly 199 is wholly aligned in proximity to base housing 102 with a portion of flexible display 106 rolling onto a back side of base housing 102. Communication device 101*a* is similar or identical to communication device 101 (FIG. 1) except antenna surface 108 is provided by blade substrate 198 of blade assembly 199.

Figures 8A, 8B, 8C, 8D:
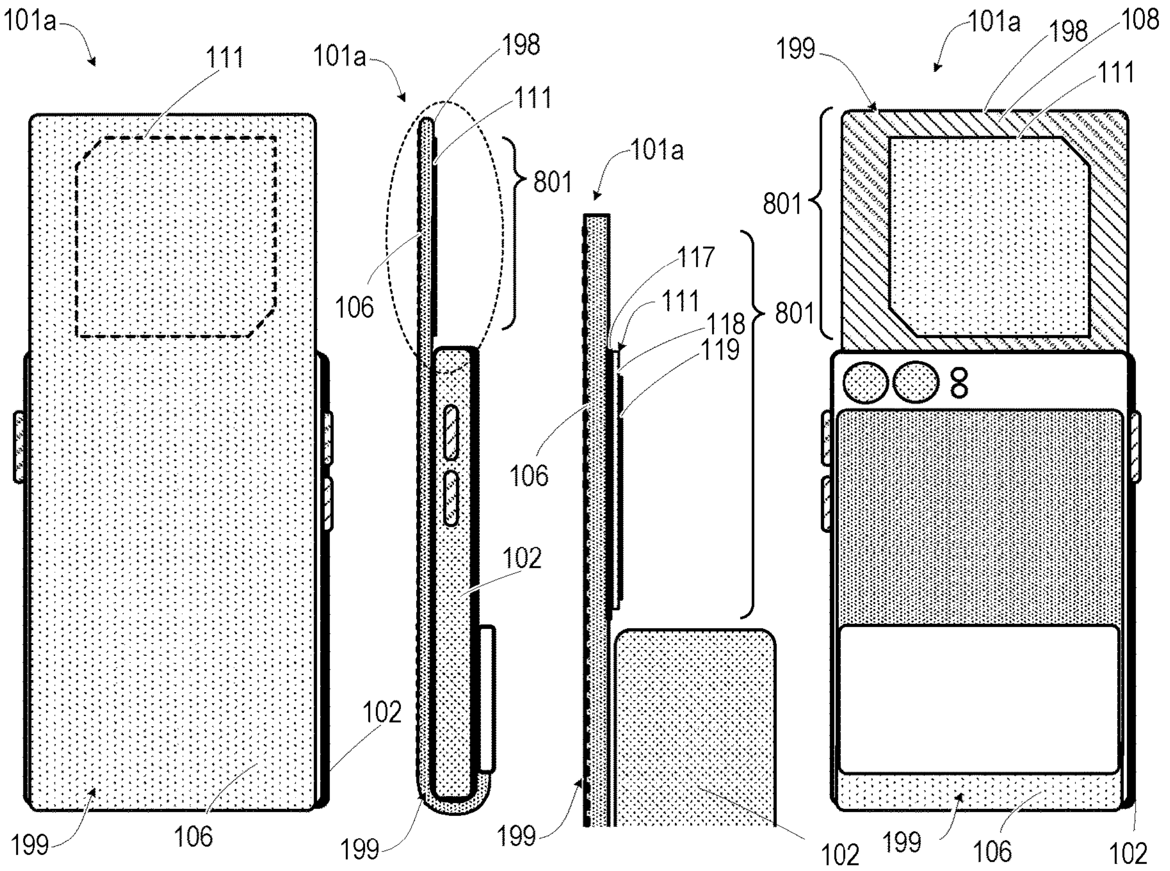
FIG. 8A is a front view of the second example communication device of FIG. 7A having the blade assembly in an extended position uncovering the patch antenna that is attached to the blade assembly, according to one or more embodiments.
FIG. 8B is a left side view of the second example communication device of FIG. 8A, according to one or more embodiments.
FIG. 8C is a left side detail view of an extended portion of the blade assembly of the second example communication device of FIG. 8B with the patch antenna affixed to a back surface of a blade substrate of the blade assembly, according to one or more embodiments.
FIG. 8D is a back view of the second example communication device of FIG. 8A presenting the patch antenna with the attached display affixed to a back surface of the blade assembly, according to one or more embodiments.

FIG. 8A is a front view of second example communication device 101*a* of FIG. 7A having blade assembly 199 in an extended position. FIG. 8B is a left side view of second example communication device 101*a* of FIG. 8A uncovering patch antenna 111 that is attached to a back side of blade substrate of 198 of blade assembly 199. FIG. 8C is a left side detail view of an extended portion of blade assembly 199 of second example communication device 101*a* of FIG. 8B. FIG. 8D is a back view of second example communication device 101*a* of FIG. 8A. With particular reference to FIGS. 8B-8D, rigid distal portion 801 of blade substrate 198 supports flexible display 106 that extends beyond base housing 102 while blade assembly 199 is in the extended position.

Figure 9A:
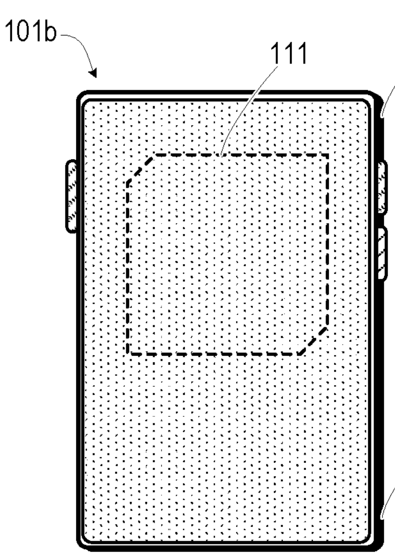
FIG. 9A is a front view of a third example communication device having a telescoping housing attached to a scrolling flexible display and covering a patch antenna while the housing is in a retracted position, according to one or more embodiments.
Figure 9B:
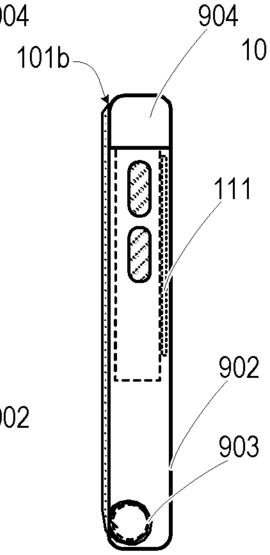
FIG. 9B is a left side view of the third example communication device of FIG. 9A, according to one or more embodiments.
Figure 9C:
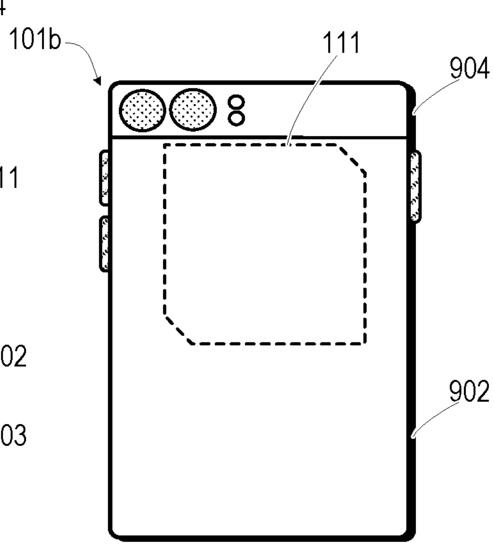
FIG. 9C is a back view of the third example communication device of FIG. 9A, according to one or more embodiments.

In the remaining embodiments, an extendable display device includes flexible display support structure (FIG. 1) implemented as a telescoping housing. Antenna surface 108 is implemented on either the telescoping housing or the base housing. In a third embodiment of FIGS. 9A-9C and 10A-10C, antenna surface 108 of communication device 101*b* is on telescoping housing 904 that extends a scrollable flexible display. Patch antenna 111 at antenna surface 108 on telescoping housing 904 is covered by base housing 902 in the retracted position and uncovered in the extended position. Communication device 101*b* is similar to communication device 101 (FIG. 1) and communication device 101*a* (FIG. 7A) except that flexible display support structure 104 (FIG. 1) is implemented as telescoping housing 904 coupled to extend from base housing 902. FIG. 9A is a front view of third example communication device 101*b*. FIG. 9B is a left side view of third example communication device 101*b* of FIG. 9A. Base housing 902 includes scroll mechanism 903 that scrolls an excess portion of flexible display 106 that is not needed to cover a front side of communication device 101*b*. FIG. 9C is a back view of third example communication device 101*b* of FIG. 9A.

Figure 10A:
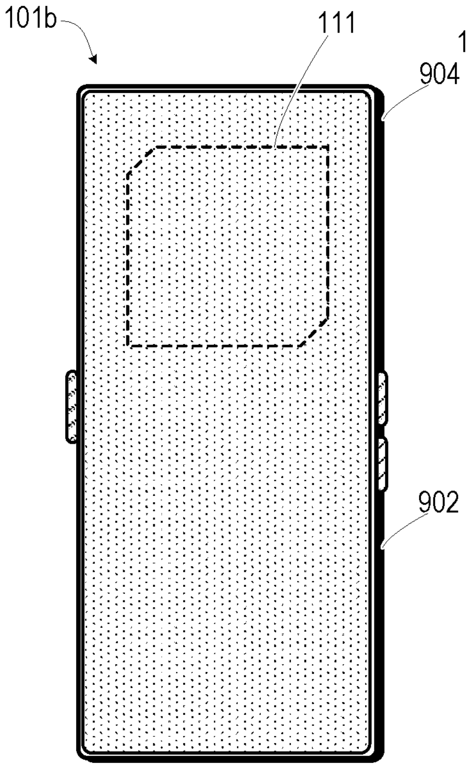
FIG. 10A is a front view of the third example communication device of FIG. 9A having the telescoping housing moved to an extended position to uncover the patch antenna that is attached to the telescoping housing, according to one or more embodiments.
Figure 10B:
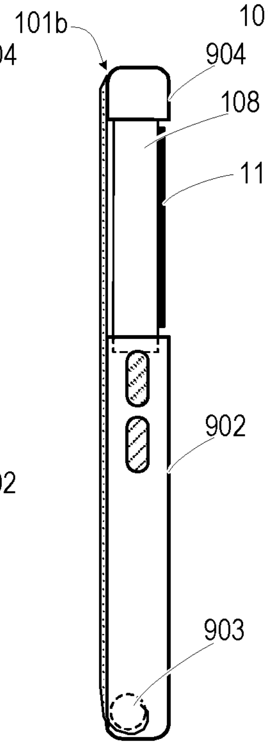
FIG. 10B is a left side view of the third example communication device of FIG. 10A, according to one or more embodiments.
Figure 10C:
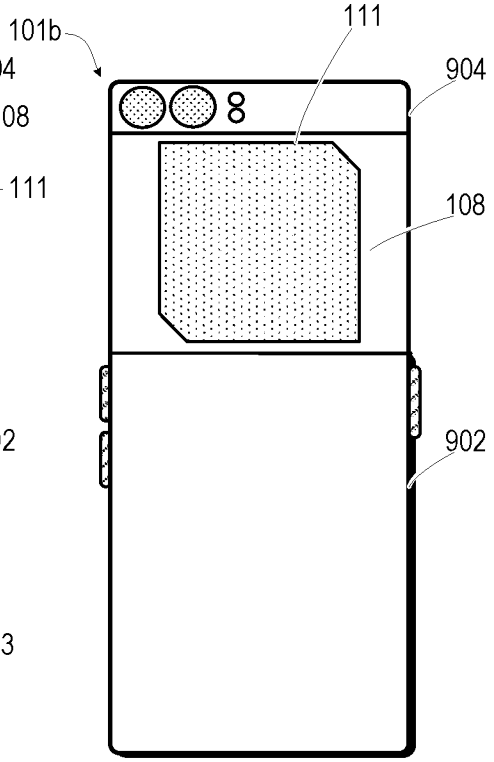
FIG. 10C is a back view of the third example communication device of FIG. 10A, according to one or more embodiments.

FIG. 10A is a front view of third example communication device 101*b* of FIG. 9A having telescoping housing 904 in an extended position. Telescoping housing 904 includes antenna surface 108 that is covered by base housing 902 while the housing is in the retracted position of FIGS. 9A-9C and uncovered while in housing is in the extended position. FIG. 10B is a left side view of third example communication device 101*b* of FIG. 10A. FIG. 10C is a back view of third example communication device 101*b* of FIG. 10A.

Figure 11A:
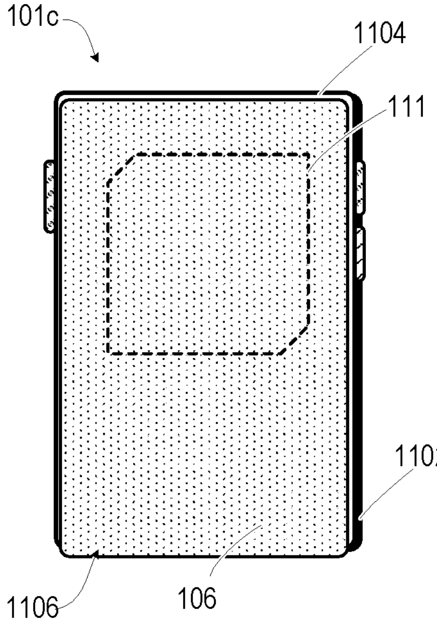
FIG. 11A is a front view of a fourth example communication device having a telescoping housing attached to a rolling flexible display and covering a patch antenna while the display is in a retracted position, according to one or more embodiments.
Figure 11B:
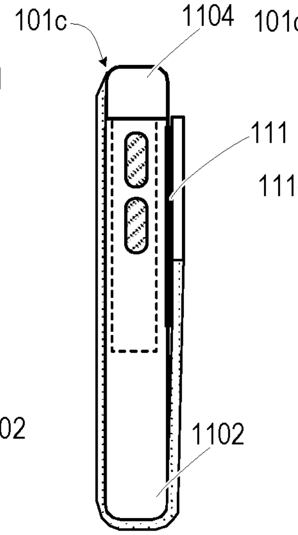
FIG. 11B is a left side view of the fourth example communication device of FIG. 11A, according to one or more embodiments.
Figure 11C:
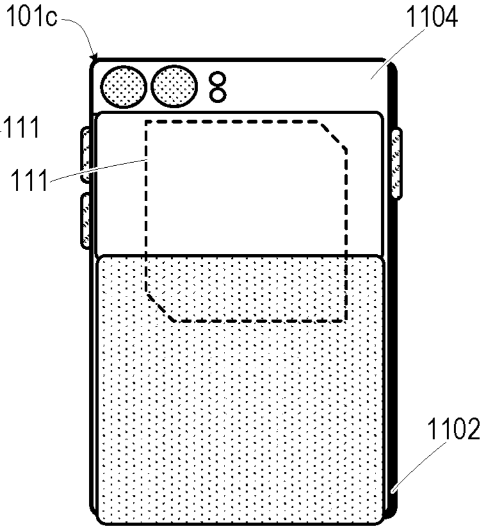
FIG. 11C is a back view of the fourth additional example communication device of FIG. 11A, according to one or more embodiments.

In a fourth embodiment in FIGS. 11A-11C and 12A-12C, antenna surface 108 of communication device 101*c* is on telescoping housing 1104 that extends a rollable display. Patch antenna 111 at antenna surface 108 on telescoping housing 1104 is covered by base housing 1102 in the retracted position and uncovered in the extended position. Communication device 101*c* is similar or identical to communication device 101 (FIG. 1), communication device 101*a* (FIG. 7A), and communication device 101*b* (FIG. 9A) with several exceptions. Flexible display 106 is incorporated into rolling display 1106 that is slidingly received by base housing 1102 and coupled to telescoping housing 1104. FIG. 11A is a front view of fourth example communication device 101*c* while in a retracted position. FIG. 11B is a left side view of fourth example communication device 101*c* of FIG. 11A having telescoping housing 1104 attached to rolling display 1106 and covering patch antenna 111 while in a retracted position. FIG. 11C is a back view of the fourth example communication device 101*c* of FIG. 11A. With particular reference to FIGS. 11B-11C, a portion of rolling display 1106 is rolled onto a back side of communication device 101*c*.

Figure 12A:
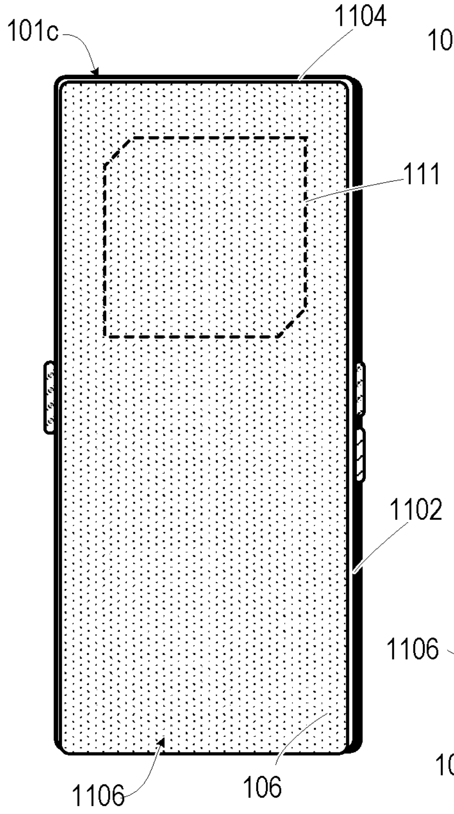
FIG. 12A is a front view of the fourth additional example communication device of FIG. 11A having the telescoping housing in an extended position uncovering the patch antenna that is attached to the telescoping housing, according to one or more embodiments.
Figure 12B:
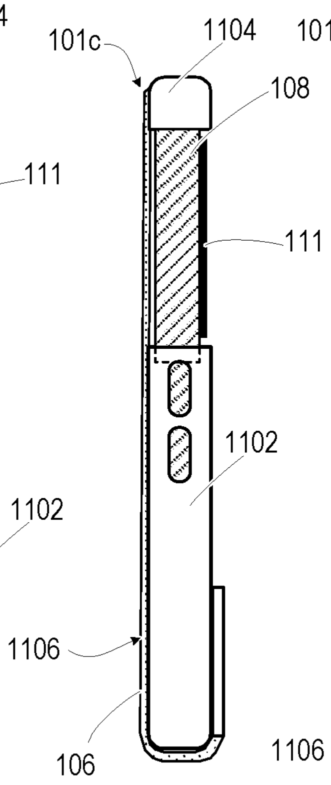
FIG. 12B is a left side view of the fourth additional example communication device of FIG. 12A, according to one or more embodiments.
Figure 12C:
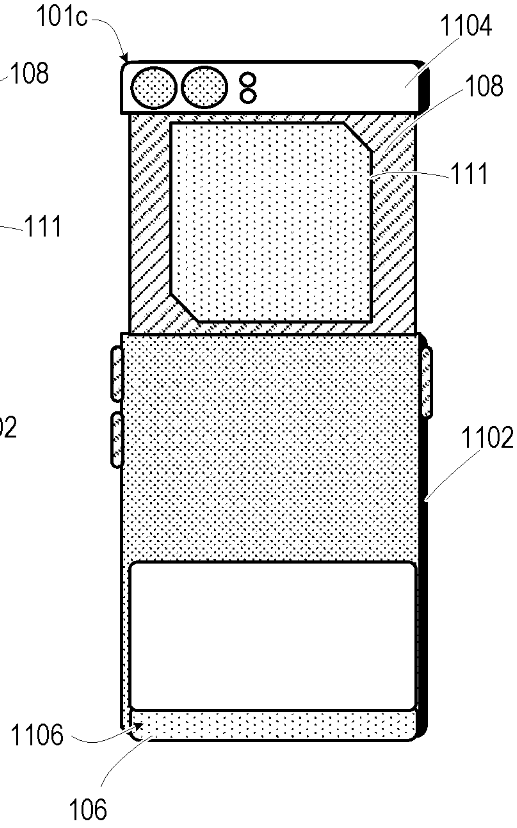
FIG. 12C is a back view of the fourth additional example communication device of FIG. 12A, according to one or more embodiments.

FIG. 12A is a front view of fourth example communication device 101*c* of FIG. 11A having telescoping housing 1104 in an extended position. FIG. 12B is a left side view of fourth example communication device 101*c* of FIG. 12A. Telescoping housing 1104 includes antenna surface 108 that is covered by base housing 1102 while in the retracted position of FIGS. 11A-11C and uncovered while in the extended position. FIG. 12C is a back view of fourth example communication device of FIG. 12A.

Figure 13A:
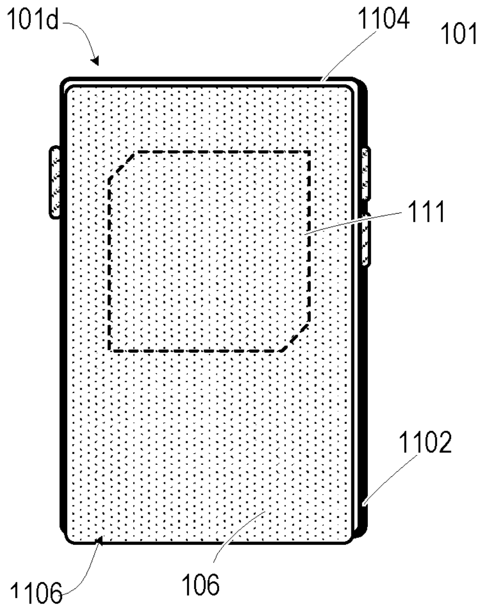
FIG. 13A is a front view of a fifth example communication device having a telescoping housing attached to a rolling flexible display and covering a patch antenna while the telescoping housing is in a retracted position, according to one or more embodiments.
Figure 13B:
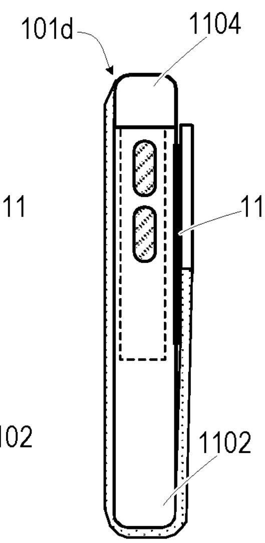
FIG. 13B is a left side view of the fifth example communication device of FIG. 13A, according to one or more embodiments.
Figure 13C:
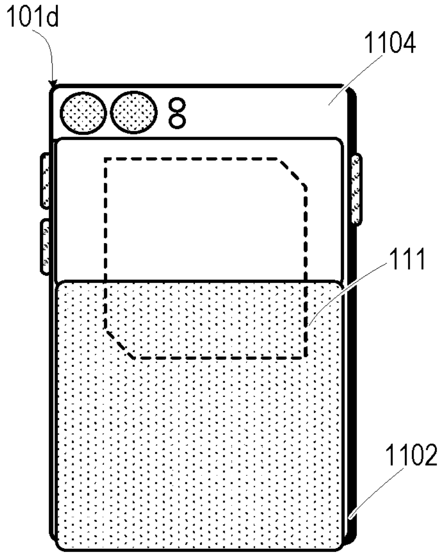
FIG. 13C is a back view of the fifth example communication device of FIG. 13A, according to one or more embodiments.

In a fifth embodiment in FIGS. 13A-13C and 14A-14C, antenna surface 108 of communication device 101*d* is on base housing 1104 that extends a rollable display. Patch antenna 111 at antenna surface 108 on telescoping housing 1104 is covered by flexible display 106 in the retracted position and uncovered in the extended position. Communication device 101*d* is similar or identical to communication device 101*c* (FIG. 11A) except patch antenna 111 is attached to base housing 1102. Antenna surface 108 is positioned on a back side of base housing 1102. FIG. 13A is a front view of fifth example communication device 101*d* while housing is in a retracted position. FIG. 13B is a left side view of fifth example communication device 101*d* of FIG. 13A having telescoping housing 1104 attached to rolling display 1106 that is also attached to base housing 1102. Rolling display 1106 covers patch antenna 111 while telescoping housing 1104 is in the retracted position and uncovered in the extended position. FIG. 13C is a back view of the fifth example communication device 101*d* of FIG. 13A. With particular reference to FIGS. 13B-13C, a portion of rolling display 1106 is rolled onto a back side of communication device 101*d*, covering patch antenna 111.

Figure 14A:
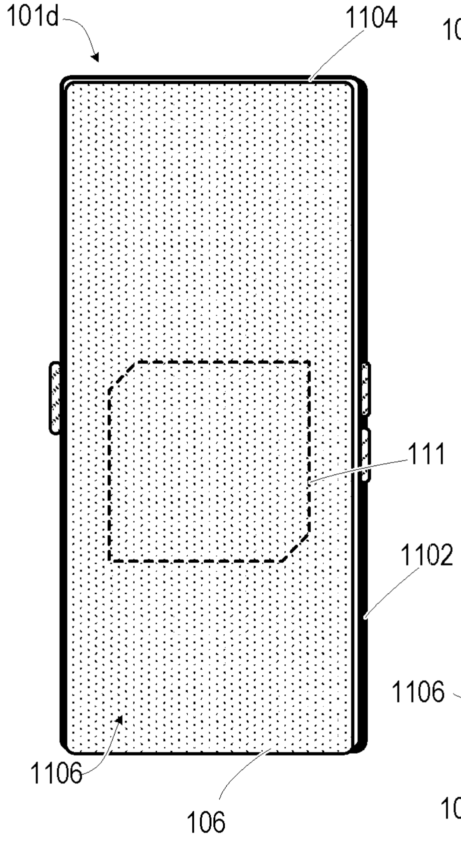
FIG. 14A is a front view of the fifth example communication device of FIG. 13A having the telescoping housing in an extended position uncovering the patch antenna that is attached to the base housing, according to one or more embodiments.
Figure 14B:
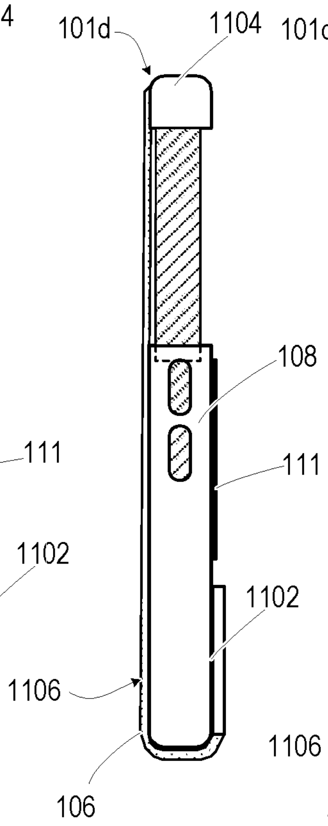
FIG. 14B is a left side view of the fifth example communication device of FIG. 14A, according to one or more embodiments.
Figure 14C:
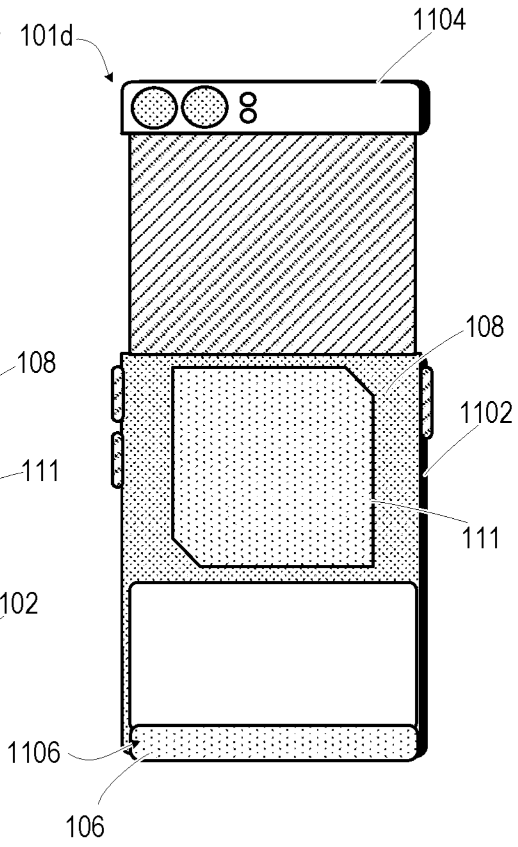
FIG. 14C is a back view of the fifth example communication device of FIG. 14A, according to one or more embodiments.

FIG. 14A is a front view of fifth example communication device 101*d* of FIG. 13A having telescoping housing 1104 in an extended position. FIG. 14B is a left side view of fifth example communication device 101*d* of FIG. 14A. Back side of base housing 1102 includes antenna surface 108 that is covered by rolling display 1106 while in the retracted position of FIGS. 13A-13C and uncovered while in the extended position. FIG. 14C is a back view of the fifth example communication device of FIG. 14A.

Figure 15A:
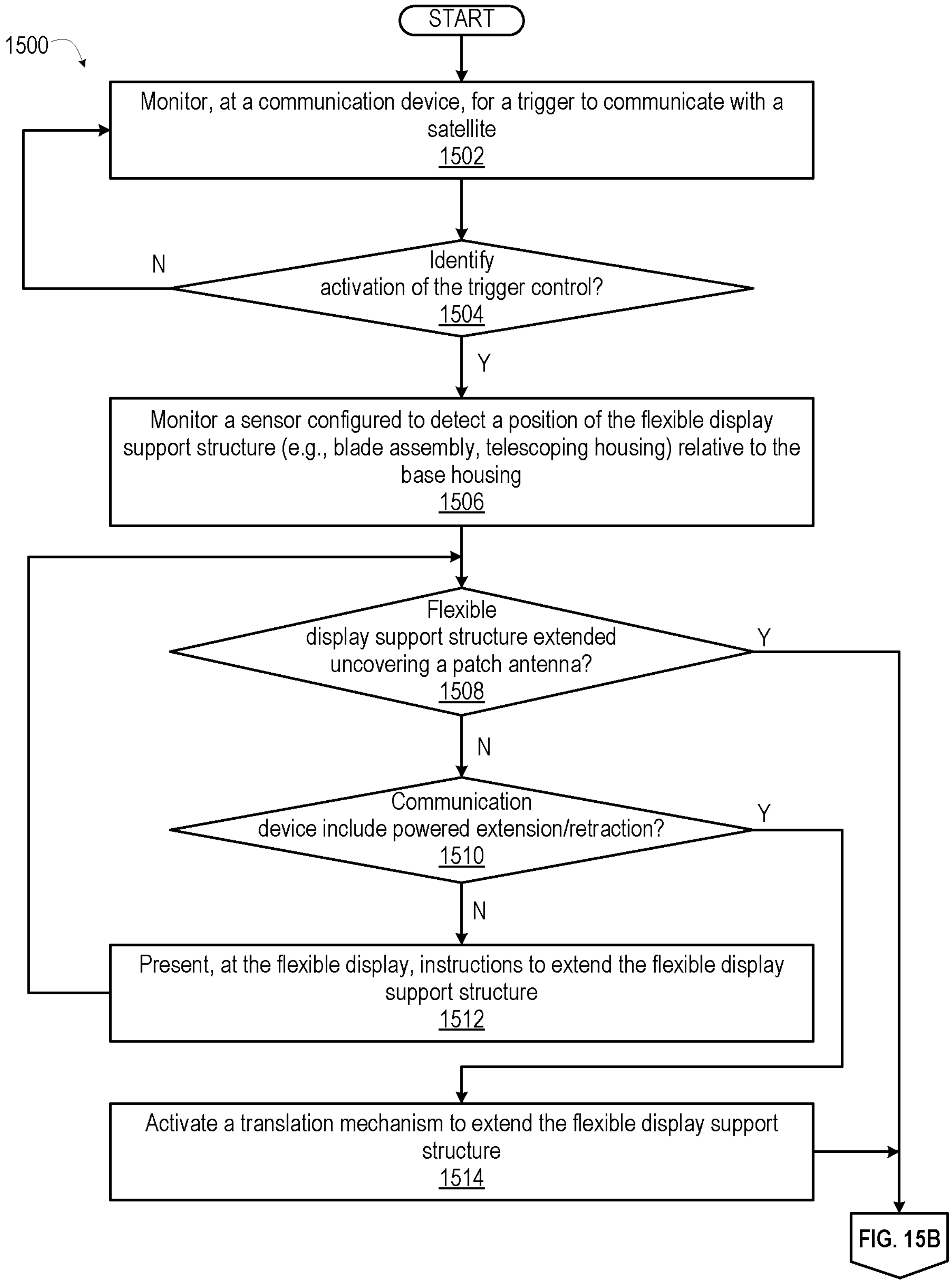
FIGS. 15A-15B (collectively "FIG. 15") are a flow diagram presenting a method of communicating with a satellite via a patch antenna incorporated into a communication device that has an extendable design form, according to one or more embodiments.
Figure 15B:
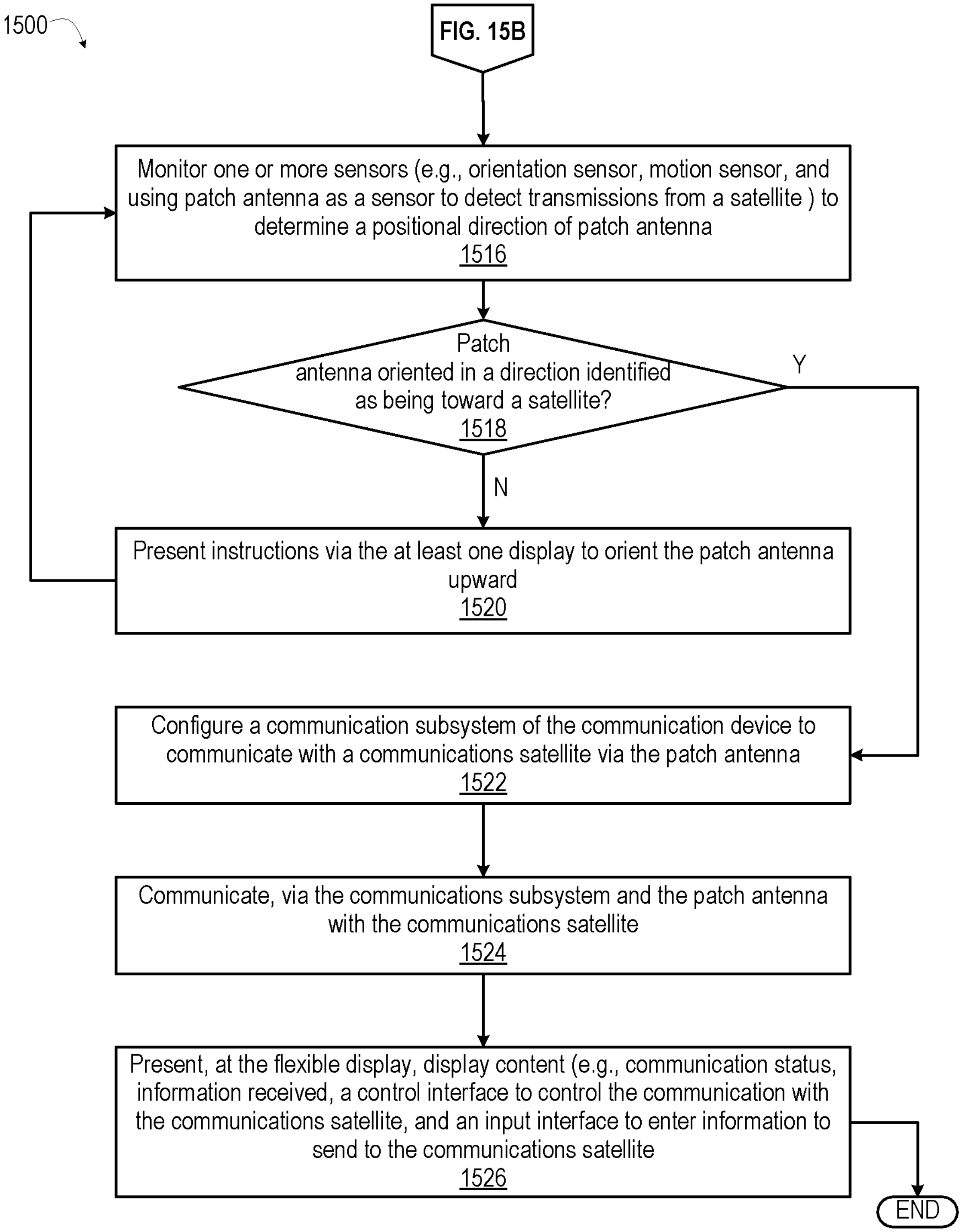

FIGS. 15A-15B (collectively "FIG. 15") are a flow diagram of a method of communicating with a satellite via a patch antenna incorporated into a user device that has an extendable design form factor. The description of method 1500 is provided with general reference to the specific components illustrated within the preceding FIGS. 1-5, 7A-7C, 8A-8D, 9A-9C, 10A-10C, 11A-11C, 12A-12C, 13A-13C, and 14A-14C. Specific components referenced in method 1500 (FIG. 15) may be identical or similar to components of the same name used in describing preceding FIGS. 1-5 and 7A-7C, 8A-8D, 9A-9C, 10A-10C, 11A-11C, 12A-12C, 13A-13C, and 14A-14C. In one or more embodiments, controller 120 (FIG. 1) configures communication device 101 (FIG. 1), communication device 101*a* (FIG. 7A), communication device 101*b* (FIG. 9A), communication device 101*c* (FIG. 11A), communication device 101*d* (FIG. 13A), or a similar computing device to provide the described functionality of method 1500 (FIG. 15).

Figure 16A:
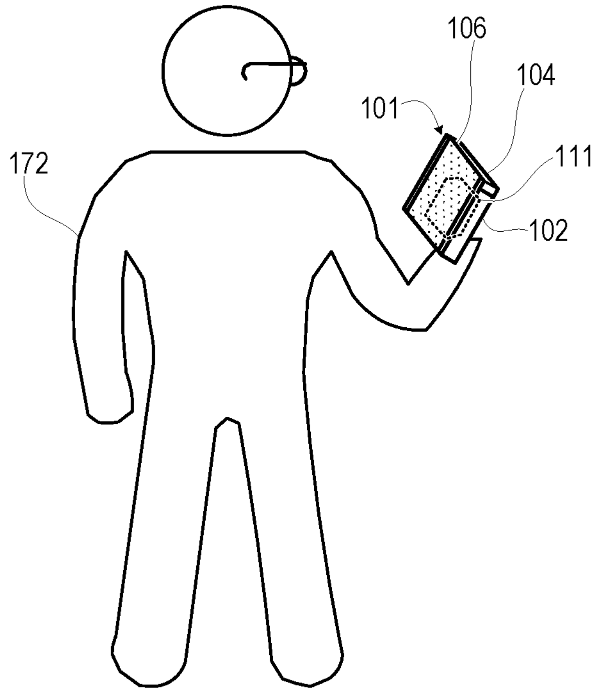
FIG. 16A is a three-dimensional view of a user holding a communication device in a retracted position, covering patch antenna, according to one or more embodiment.

With reference to FIG. 15A, in one or more embodiments, method 1500 includes monitoring, at a communication device, for a trigger to communicate with a satellite (block 1502). Method 1500 includes determining whether the trigger to communicate with a satellite is identified (block 1504). In an example, method 1500 may include identifying that an alert control button is activated. In another example, method 1500 may include identifying that a health monitoring device such as a smartwatch that is communicatively coupled to the communication device has provided a trigger such as an abnormal heart rhythm. In an additional example, method 1500 may include identifying that a motion detector provides a trigger due to an acceleration that is detected indicative of a fall or vehicular accident. In a further example, method 1500 may include identifying that the motion detector provides a trigger due to a lack of acceleration for a period of time that may be indicative of a misplaced communication device or an incapacitated user. In response to determining that the trigger to communicate with the satellite is not identified, method 1500 returns to block 1502. In response to determining that the trigger to communicate with the satellite is identified, method 1500 includes monitoring a sensor configured to detect a position of the flexible display support structure (e.g., blade assembly, telescoping housing) relative to the base housing (block 1506). Method 1500 includes determining whether a flexible display support structure of the communication device is extended uncovering a patch antenna (decision block 1508). In an example, FIG. 16A is a three-dimensional view of user 172 holding communication device 101 having flexible display support structure 104 and base housing 102 in a retracted position, covering patch antenna 111. Flexible display 106 is oriented generally upward. With continuing reference to FIG. 15A, in response to determining that the flexible display support structure of the communication device is not extended (i.e., the structure is retracted) and/or that the patch antenna is not uncovered, method 1500 includes determining whether the communication device includes powered extension/retraction capability (decision block 1510). In response to determining that the communication device does not include powered extension/retraction capability, method 1500 includes presenting, at the flexible display, instructions to extend the flexible display support structure (block 1512). Then method 1500 returns to block 1508. In response to determining that the communication device includes powered extension/retraction capability, method 1500 includes activating a translation mechanism to extend the flexible display support structure (block 1514). In an example, translation mechanism 105 moves blade assembly 199 (FIG. 1). In another example, translation mechanism 105 (FIG. 1) moves telescoping housing 904 relative to base housing 902 (FIG. 9A). In an additional example, translation mechanism 105 (FIG. 1) moves telescoping housing 1104 relative to base housing 1102 (FIG. 11A). In a further example, translation mechanism 105 (FIG. 1) moves telescoping housing 1104 relative to base housing 1102 (FIG. 13A). In response to determining that the flexible display support structure of the communication device is extended, uncovering the patch antenna, in decision block 1508 or after block 1514, method 1500 proceeds to block 1516 of FIG. 15B.

Figure 16B:
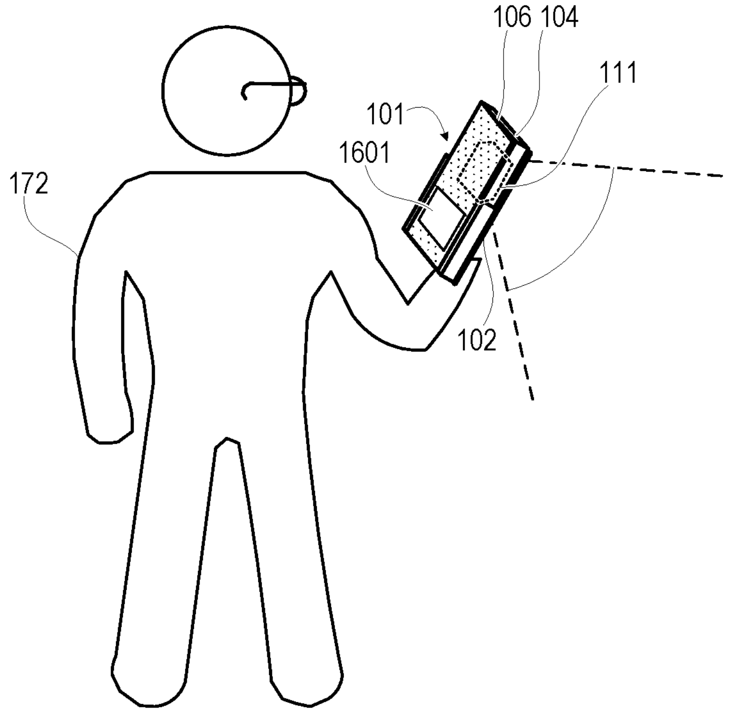
FIG. 16B is a three-dimensional view of a user holding the communication device in an extended position to view a flexible display, uncovering a patch antenna that is oriented downward, according to one or more embodiment.
Figure 16C:
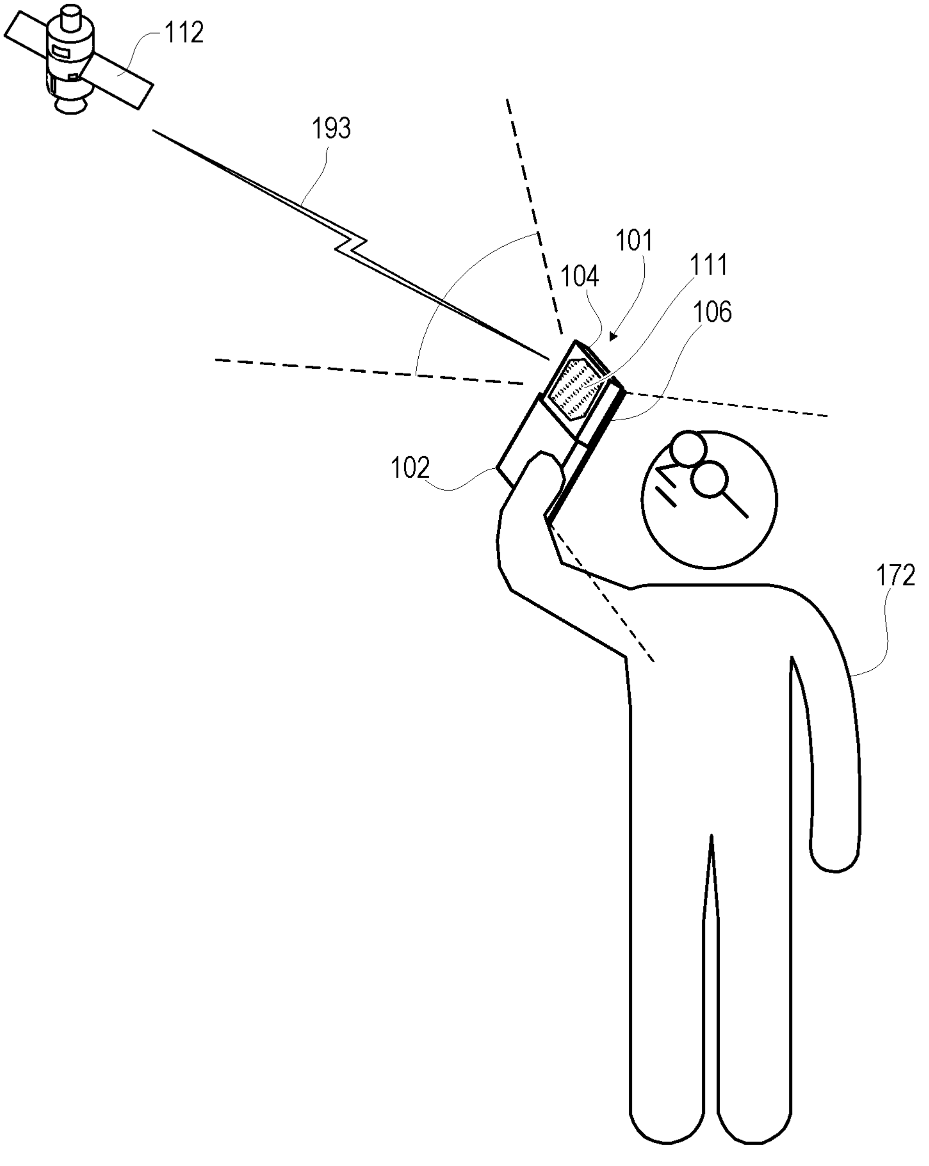
FIG. 16C is a three-dimensional view of a user holding the communication device in an extended position to view a flexible display, uncovering a patch antenna that is oriented upward, according to one or more embodiment.
Figure 16D:
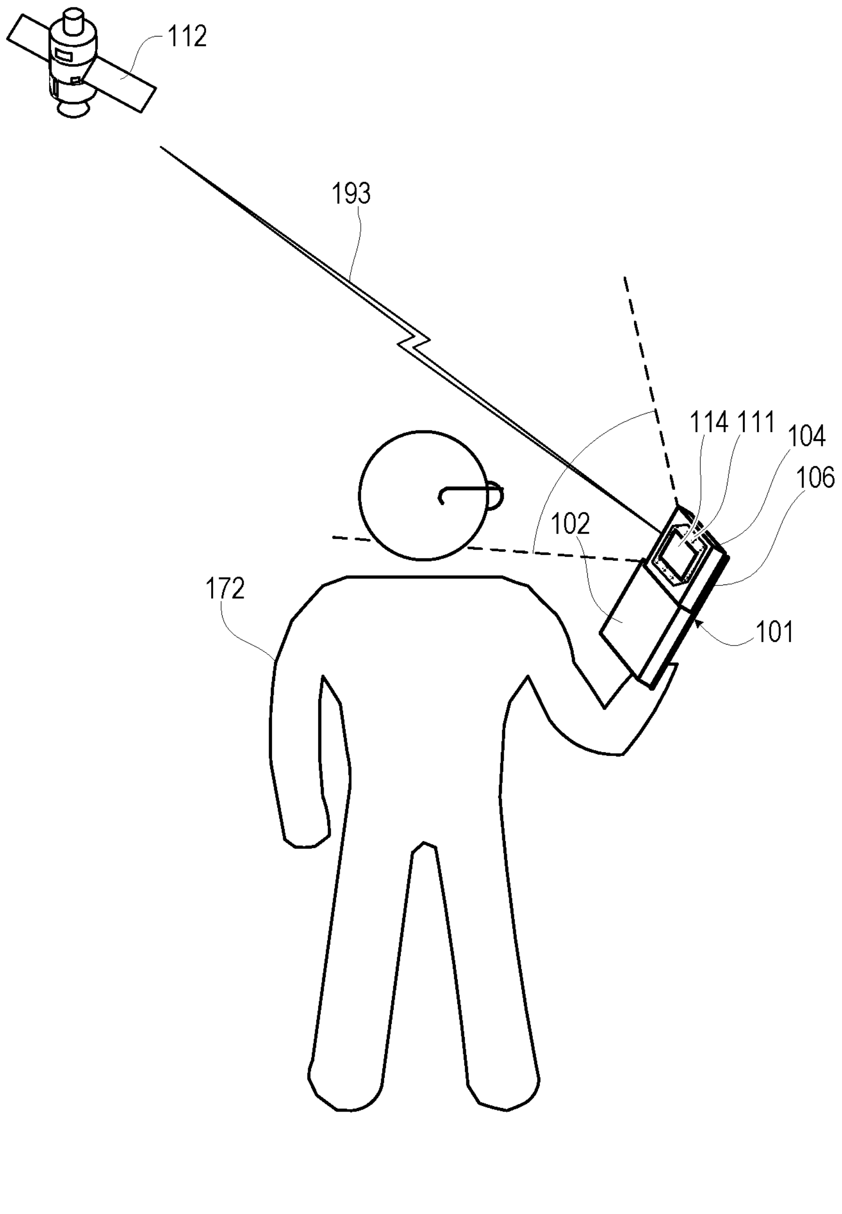
FIG. 16D is a three-dimensional view of a user holding the communication device in an extended position to view a display stacked on the uncovered patch antenna that is oriented upward, according to one or more embodiment.

With reference to FIG. 15B, method 1500 includes monitoring one or more sensors (e.g., orientation sensor, motion sensor, and patch antenna being used a sensor to detect transmissions from a satellite) to determine a positional direction of patch antenna (block 1516). The patch antenna is not a dedicated sensor but may be used secondarily as a sensor to detect whether a current orientation of the patch antenna enables receiving broadcasts or a downlink from a satellite. Method 1500 includes determining whether the patch antenna is oriented in a direction identified as being toward a satellite (block 1518). As an example, method 1500 can include determining whether the patch antenna is oriented upward, as it would be customary for the satellite to be located in the sky above the device. In response to determining that the patch antenna is not oriented toward the satellite (e.g., upward), method 1500 includes presenting instructions via the at least one display to orient the patch antenna upward (block 1520). In an example, FIG. 16B is a three-dimensional view of user 172 holding communication device 101 having flexible display support structure 104 and base housing 102 in an extended position, uncovering patch antenna 111. Flexible display 106 is oriented generally upward and presenting instructions 1601 being viewed by user 172. Patch antenna 111 is oriented generally downward. With continuing reference to FIG. 15A, then, method 1500 returns to block 1516. In response to determining that the patch antenna is oriented upward, method 1500 includes configuring a communication subsystem of the communication device to allow the communication device to communicate with a communications satellite via the patch antenna (block 1522). In an example, FIG. 16C is a three-dimensional view of user 172 holding communication device 101 having flexible display support structure 104 and base housing 102 in an extended position, uncovering patch antenna 111. Flexible display 106 is oriented generally downward and being viewed by user 172. Patch antenna 111 is oriented generally upward toward satellite 112. Display 114 (FIG. 1) is not provided on a back side of communication device 101. In another example, FIG. 16D is a three-dimensional view of user 172 holding communication device 101 having flexible display support structure 104 and base housing 102 in an extended position, uncovering patch antenna 111. Flexible display 106 is oriented generally downward and not being viewed by user 172. Patch antenna 111 is oriented generally upward toward satellite 112. Display 114 stacked on patch antenna 111 is being viewed by user 172. With continuing reference to FIG. 15A, method 1500 includes communicating, via the communications subsystem and the patch antenna with the communications satellite (block 1524). Method 1500 includes presenting, at the flexible display, display content (e.g., communication status, information received, a control interface to control the communication with the communications satellite, and/or an input interface to enter information to send to the communications satellite (block 1526). Then method 1500 ends.

In one or more embodiments, method 1500 includes monitoring an orientation sensor. Method 1500 includes presenting instructions via at least one display to orient the patch antenna upward, in response to detecting the patch antenna is oriented downward or partially downward (i.e., not oriented upward) prior to initiating communication via the patch antenna. Method 1500 includes communicating, via the communications subsystem and the patch antenna with the communications satellite, in response to subsequently detecting the patch antenna is re-oriented upward.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. A communication device comprising:

a base housing having a front side and a back side;

a flexible display support structure moveably attached to and positionable on the base housing between a retracted position and an extended position relative to the base housing, one of the flexible display support structure and the base housing having an antenna surface that is covered by the other one of the flexible display support structure and the base housing while the flexible display support structure is in the retracted position and uncovered while the flexible display support structure is in the extended position;

a flexible display coupled across a front side of the base housing and the flexible display support structure to present a larger portion of the flexible display while the flexible display support structure is in the extended position and a smaller portion of the flexible display while the flexible display support structure is in the retracted position;

a patch antenna positioned on the antenna surface and comprising: (i) a ground plane; (ii) a substrate comprising a low dielectric constant and low loss material and positioned on the ground plane; and (iii) a conductive radiator patch positioned on the substrate;

a controller; and an orientation sensor communicatively coupled to the controller and configured to detect an orientation of the patch antenna, and wherein the controller communicates, via the communications subsystem and the patch antenna, in response to detecting the patch antenna is oriented upward.

2. The communication device of claim 1, wherein the flexible display support structure comprises a telescoping housing having an extension portion slidingly received into the base housing while the telescoping housing is in the retracted position, the extension portion comprising the antenna surface.

3. The communication device of claim 1, wherein:

the flexible display support structure comprises a blade assembly having a blade slidably coupled to the base housing;

the flexible display is coupled to a front side of the blade to move with the blade between the retracted position and the extended position;

the communication device further comprises a translation mechanism operable to slide the blade assembly relative to the base housing between the retracted position and the extended position; and the antenna surface is on a back side of a distal portion of the blade that extends beyond the base housing while the blade assembly is in the extended position.

4. The communication device of claim 1, wherein:

the flexible display support structure comprises a blade assembly having a blade slidably coupled to the base housing;

the flexible display is coupled to a front side of the blade to move with the blade between the retracted position and the extended position, a portion of the flexible display rolling onto the back side of the base housing while in the retracted position;

the communication device further comprises a translation mechanism operable to slide the blade assembly relative to the base housing between the retracted position and the extended position; and the antenna surface is on a back side of the base housing that is covered by the blade assembly while the blade assembly is in the retracted position and uncovered while the blade assembly is in the extended position.

5. The communication device of claim 1, wherein:

the flexible display support structure comprises a telescoping housing having an extension portion slidingly received into the base housing while the telescoping housing is in the retracted position;

the flexible display is coupled to the telescoping housing and rolls an excess portion around the base housing onto a back side of the base housing while the telescoping housing is in the retracted position; and the antenna surface is on a back side of base housing that is covered by the flexible display while the flexible display is in the retracted position and uncovered while the flexible display is in the extended position.

6. The communication device of claim 1, further comprising:

a communications subsystem;

a memory that stores a communications application; and the controller communicatively coupled to the communications subsystem and the memory, and which:

in response to identifying a trigger to execute the communications application:

configures the communication subsystem to allow the communication device to communicate with a communications satellite via at least one of an uplink and a downlink via the patch antenna; and communicates, via the communications subsystem and the patch antenna with the communications satellite.

7. The communication device of claim 6, wherein:

the communications application comprises an emergency alert application; and the controller presents a communications user interface at the flexible display based on communication with the communications satellite.

8. The communication device of claim 6, further comprising an orientation sensor communicatively coupled to the controller and configured to detect an orientation of the patch antenna, and wherein the controller:

presents instructions via at least one display to orient the patch antenna upward, in response to detecting the patch antenna is oriented downward prior to initiating communication via the patch antenna; and communicates, via the communications subsystem and the patch antenna with the communications satellite, in response to subsequently detecting the patch antenna is re-oriented upward.

9. The communication device of claim 1, wherein:

the patch antenna is configured to transmit and to receive a right hand circularly polarized (RHCP) radio frequency (RF) signal in a frequency range of 1-2 GHz; and the substrate comprises a plastic material of 1 mm thickness.

10. A method comprising:

presenting, at a flexible display of a communication device, a user interface comprising a trigger control for executing a communication application, the communication device comprising a flexible display support structure moveably attached to and positionable on a base housing between a retracted position and an extended position relative to the base housing, one of the flexible display support structure and the base housing having an antenna surface that is covered while the flexible display support structure is in the retracted position and uncovered while the flexible display support structure is in the extended position by the other one of the flexible display support structure and the base housing, the flexible display coupled across a front side of the base housing and the flexible display support structure to present a larger portion of the flexible display while the flexible display support structure is in the extended position and a smaller portion of the flexible display while the flexible display support structure is in the retracted position; and in response to identifying a trigger received at the flexible display to execute a communications application stored in memory of the communication device:

configuring a communication subsystem of the communication device to allow the communication device to communicate with a communications satellite via at least one of an uplink and a downlink via a patch antenna positioned on the antenna surface and comprising: (i) a ground plane; (ii) a substrate comprising a low dielectric constant and low loss material and positioned on the ground plane; and (iii) a conductive radiator patch positioned on the substrate;

determining that the flexible display support structure is in the extended position;

detecting an orientation of the patch antenna; and communicating, via the communications subsystem and the patch antenna with the communications satellite, in response to determining that the flexible display support structure is in the extended position and detecting the patch antenna is oriented upward.

11. The method of claim 10, wherein the communications application comprises an emergency alert application, and the method further comprises presenting, at the flexible display, a communications user interface generated by the emergency alert application based on communication with the communications satellite.

12. The method of claim 10, wherein determining that the flexible display support structure is in the extended position comprises:

monitoring a sensor configured to detect a position of the flexible display support structure.

13. The method of claim 12, further comprising:

in response to determining that the flexible display support structure is in the retracted position, presenting, at the flexible display, instructions to extend the flexible display support structure.

14. The method of claim 12, further comprising:

in response to determining that the flexible display support structure is in the retracted position, activating a translation mechanism to extend the flexible display support structure.

15. A computer program product comprising:

a computer readable storage device; and program code on the computer readable storage device that when executed by a processor associated with a communication device, the program code enables the communication device to provide functionality of:

presenting, at a flexible display of the communication device, a user interface comprising a trigger for executing a communication application, the communication device comprising a flexible display support structure moveably attached to and positionable on a base housing between a retracted position and an extended position relative to the base housing, one of the flexible display support structure and the base housing having an antenna surface that is covered while the flexible display support structure is in the retracted position and uncovered while the flexible display support structure is in the extended position by the other one of the flexible display support structure and the base housing, the flexible display coupled across a front side of the base housing and the flexible display support structure to present a larger portion of the flexible display while the flexible display support structure is in the extended position and a smaller portion of the flexible display while the flexible display support structure is in the retracted position; and in response to identifying a trigger received at the flexible display to execute a communications application stored in memory of the communication device:

configuring a communication subsystem of the communication device to allow the communication device to communicate with a communications satellite via at least one of an uplink and a downlink via a patch antenna positioned on the antenna surface and comprising: (i) a ground plane; (ii) a substrate comprising a low dielectric constant and low loss material and positioned on the ground plane; and (iii) a conductive radiator patch positioned on the substrate;

determining that the flexible display support structure is in the extended position;

detecting an orientation of the patch antenna; and communicating, via the communications subsystem and the patch antenna with the communications satellite, in response to determining that the flexible display support structure is in the extended position and detecting the patch antenna is oriented upward.

16. The computer program product of claim 15, wherein the program code enables the communication device to provide functionality of presenting a communications user interface for the communications application comprising an emergency alert application at the flexible display based on communication with the communications satellite.

17. The computer program product of claim 15, wherein the program code for determining that the flexible display support structure is in the extended position enables the communication device to provide functionality of:

monitoring a sensor configured to detect a position of the flexible display support structure.

18. The computer program product of claim 17, wherein the program code enables the communication device to provide functionality of:

in response to determining that the flexible display support structure is in the retracted position, presenting, at the flexible display, instructions to extend the flexible display support structure.

19. The computer program product of claim 17, wherein the program code enables the communication device to provide functionality of:

in response to determining that the flexible display support structure is in the retracted position, activating a translation mechanism to extend the flexible display support structure.

* * * * *